United States Patent [19]

Ephraim

[11] Patent Number: 4,998,274
[45] Date of Patent: Mar. 5, 1991

[54] ISDN DUAL BUS EXTENSION PHONE SYSTEM

[75] Inventor: Robert M. Ephraim, Livingston, N.J.

[73] Assignee: Bell Communications Research, Inc., Livingston, N.J.

[21] Appl. No.: 446,639

[22] Filed: Dec. 6, 1989

[51] Int. Cl.[5] .......................................... H04M 9/00
[52] U.S. Cl. .................................. 379/158; 379/159; 379/160; 370/85.13
[58] Field of Search ............... 379/156, 158, 159, 160; 370/85.13

[56] References Cited

U.S. PATENT DOCUMENTS

| | | | |
|---|---|---|---|
| 4,449,218 | 5/1984 | Strehl | 370/69.1 |
| 4,591,827 | 5/1986 | Nishita et al. | 340/347 C |
| 4,603,417 | 7/1986 | Shirasu et al. | 370/62 |
| 4,722,082 | 1/1988 | Furuya et al. | 370/85 |
| 4,792,800 | 12/1988 | Fujioka et al. | 340/825.05 |
| 4,868,847 | 9/1989 | Kirby | 379/160 |

Primary Examiner—Stafford D. Schreyer
Attorney, Agent, or Firm—James W. Falk; Lionel N. White

[57] ABSTRACT

Several ISDN telephone terminals in a passive bus configuration are enabled to be used to share a single voice communication in the familiar extension phone arrangement by means of a second bus connecting the analog sides of the terminal circuits. Once an incoming or outgoing voice call has been established at one of the number of ISDN terminals located on the premises, any others of such terminals may join the conversation by simply completing an off-hook connection by way of the analog bus. In conversion of premises to ISDN systems, the abandoned conventional telephone wiring may be employed as the analog bus. Conventional analog phones may also be utilized with ISDN voice terminals via the analog bus.

20 Claims, 2 Drawing Sheets

ISDN DUAL BUS EXTENSION PHONE SYSTEM

BACKGROUND OF THE INVENTION

The standard operating protocols for ISDN (Integrated Services Digital Network) systems severely limit the capability of establishing direct communication between terminal equipment within a given premises. The prescribed physical layer standards applicable to an ISDN customer installation and the call set-up signaling requirements, for example, all but eliminate the ability to use ISDN phones at a single site, such as within a home, in unrestricted intercommunication similar to that normally enjoyed with common analog telephone instruments. As a result, ISDN equipment lacks the usual "extension phone" utility to which users, at least in the United States, have long been accustomed.

As presently structured, ISDN communication systems require that voice messages between terminal equipment units employ the circuit-switched B-channels which are capable of connecting specifically designated terminal units only through at least one local switch via their respective local passive buses, network termination elements, and subscriber lines. Calls between individual terminal unit phones within one premises must be made in the same dedicated manner as those between distant locations, thus there is no means by which a second phone unit at a given location may be included as an "extension" in an ISDN communication. This basic limitation on the utility of ISDN phone systems poses a substantial threat to the widespread acceptability, particularly among domestic users, of this otherwise broadly capable advancement in communications.

The present invention provides a means by which ISDN terminal phone equipment, and ordinary analog phones as well, may be readily and economically employed in an extension phone mode in ISDN voice communication systems.

SUMMARY OF THE INVENTION

As generally structured, ISDN phone equipment comprises a digital section, including components for D-channel out-of-band "Q.931" call control messaging and B-and D-channel MDX (multiplexer/demultiplexer) and codec (coder/decoder) components, and an analog section which includes the electro/audio transducer components of the unit. The digital ISDN section of the conventional ISDN phone terminal manages the set-up and processing of calls according to established protocols and is responsible for translating the digital message flow to and from the user end analog signals. The analog section of the terminal provides the audio aspects of the user interface function normally found in a conventional analog phone.

In providing the basic extension phone capability for ISDN terminal equipment, the present invention does not generally affect the dedicated digital signaling and call processing functions of the digital section of the terminal, but utilizes, instead, the analog section of the instrument. By means of an interface, preferably of the AC-coupled type to isolate DC operating power sources, at the analog side of the ISDN instrument codec, analog signals are communicated with an analog bus which in turn may communicate such signals with other ISDN instruments and conventional analog phones. Thus, a number of ISDN and analog phone terminals may participate, via the analog bus, in audio communications initially established in the ISDN network by one of the ISDN phones.

The analog bus employed in this extension phone system is a common wire pair and may be simply and economically established in existing premises by utilizing previously deployed analog phone wiring which would otherwise likely be abandoned after isolation from the subscriber loop during ISDN conversion of the premises. The adaptation of conventional ISDN terminals by the addition, either as an external attachment or internal to the terminal, of an analog side interface to a simple wire pair allows these instruments to then be ported to the analog bus by means of a standard RJ11 modular connector. Electrical power to an analog phone served by the analog bus may be supplied directly to the bus from an independent source or may be supplied through one or more of the ISDN terminals connected to the bus.

Various optional arrangements may be added to this basic dual bus architecture. For example, switches may be included for selective isolation of an ISDN terminal from the analog bus for the purpose of privacy, or for selective connection of a terminal or bus to one or more of a number of analog buses within the premises. Further, the ISDN terminal may take the form of a combination of an ISDN terminal adapter and conventional analog phone unit.

The extent of call control distributed to dual bus ISDN terminals and analog phones connected to the analog bus may be varied considerably. The normal ISDN protocol is not affected by the addition of an analog bus and implementation of dual bus ISDN terminals. As a result, the ISDN terminal that establishes a call would normally continue to control that call until cleared regardless of the number of other ISDN or analog phones which might be involved in the call. However, in the event that it is desired to allow other extension terminals or phones to have a greater degree of call participation, those terminals could be given various levels of control over the ISDN terminal controlling the call.

For example, the initiation of call clearing from the controlling terminal could be inhibited by a detected current flow indicating an off-hook condition at one or more of the other terminals or analog phones on the analog bus network, thereby enabling continued extension phone conversation after the controlling terminal phone has gone on-hook. Further, for even greater control distribution, an off-hook condition at an analog bus terminal or phone could signal an ISDN phone in the "call received" state to transmit a CONNECT message to the ISDN switch, thereby enabling an analog bus extension phone to independently answer the call via that ISDN terminal. Other variants in the capabilities of the present invention will be apparent in the following description.

THE DRAWING

The present invention will be described with reference to the accompanying drawing of which:

DESCRIPTION OF THE INVENTION

Figure 1:
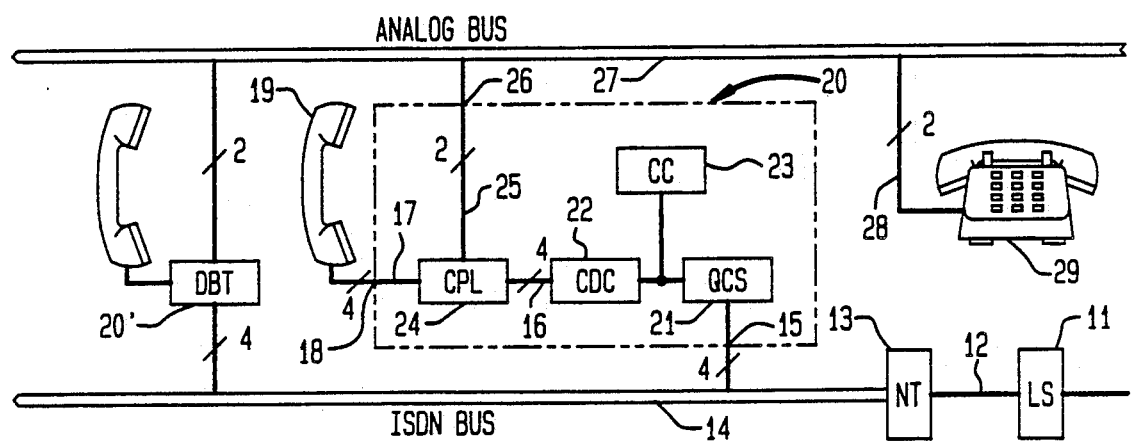
FIG. 1 is a block diagram of a basic ISDN dual bus terminal arrangement according to the present invention.

A conventional ISDN network loop is depicted in part in FIG. 1 as comprising an ISDN local switch (LS) 11 which receives transmissions from within the network and forwards specified messages via digital subscriber line 12 to the designated network terminator (NT) 13 associated with the addressee ISDN customer. The NT 13 located on the customer premises converts between digital subscriber line and ISDN passive bus signal formats. A number of ISDN terminals, such as dual bus terminal 20 of the present invention, may be connected to ISDN bus 14 by means of four-conductor cable via digital signal port 15.

Dual bus terminal 20 includes basic components of a conventional ISDN terminal, namely Q.931 message controlled switch (QCS) 21, including S-interface transceiver and B-and D-channel multiplexer/demultiplexer elements, analog/digital (PCM) signal conversion codec (CDC) 22, and call control (CC) component 23. A call received from a distant location via LS 11 is normally passed to a conventional ISDN terminal through NT 13 and is communicated from bus 14 via ISDN signal port 15 of the terminal to QCS component 21. After demultiplexing at QCS 21, conversation is forwarded, under the direction of CC 23, to CDC 22 from which they are output as analog signals on cable 16-17 to conventional electro/audio analog signal transducer handset 19 via analog signal port 18. Two-way ISDN network communications will normally follow this processing path in a common ISDN terminal and there is thus no opportunity for a second local premises terminal to participate in a conversation.

Figure 2:
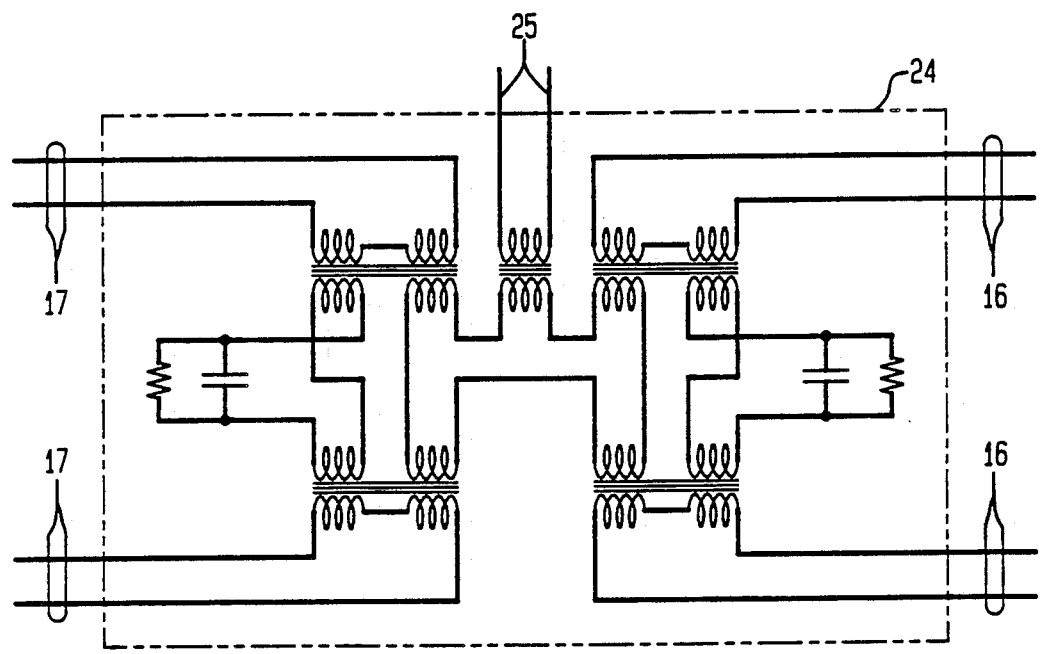
FIG. 2 is a schematic diagram of an embodiment of a coupler component comprising the dual bus terminal of FIG. 1.

A dual bus terminal 20 of the present invention additionally comprises a coupling component (CPL) 24 situated on the analog side of CDC 22, for example between cable connector sections 16, 17. By means of CPL 24 a communication tap for analog conversation signals is provided between line 16-17 and two-wire line 25 leading to a second analog signal port 26. An AC-coupling network, as shown in FIG. 2, provides an effective means for safely appending two-wire line 25 to the four-wire analog line 16-17 of a conventional ISDN terminal even in the presence of an external DC power source. An extended two-wire communication line, such as may be obtained by isolating conventional on-premises analog phone wiring from the subscriber's loop, provides an analog bus 27 to which analog port 26 is connected. Other dual bus terminals, such as DBT 20', may likewise be connected to that bus. Analog bus 27 may also be connected by wire pair 28 to a conventional analog phone 29 which may then be employed in this simple configuration as a means for conversing with a distant caller once communication has been established with the ISDN network by means of DBT 20.

Figure 3:
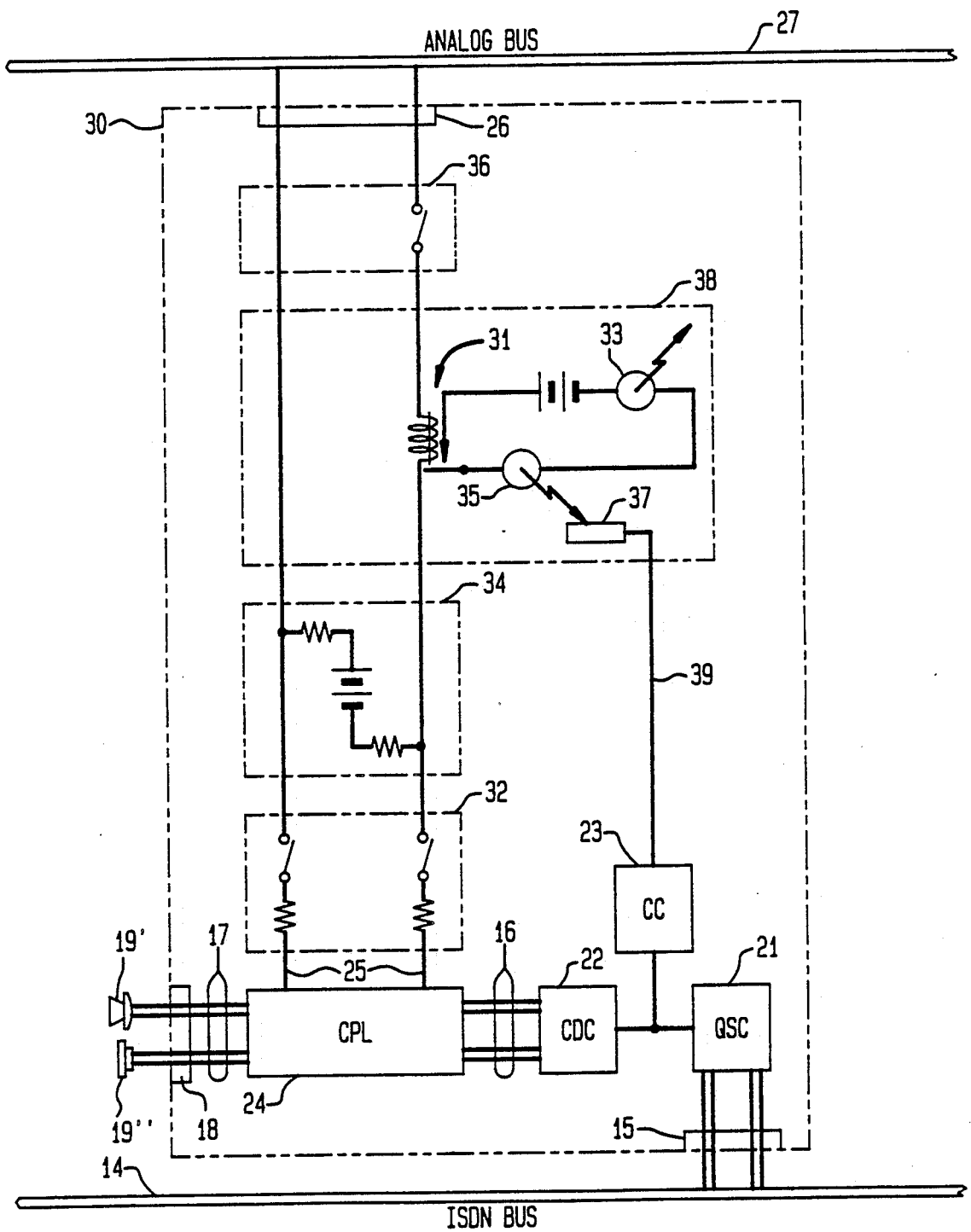
FIG. 3 is a block diagram of an embodiment of the dual bus terminal depicting various optional features.

In operation, dual bus terminal 20 may be used in the usual manner to establish communication with a distant terminal in the ISDN network, yet by means of analog bus 27 additional terminals are enabled to participate in the ensuing conversation. The basic configuration depicted in FIG. 1 provides a constant such extension phone capability. It may, however, be desired in some circumstances, e.g. in the interest of privacy, to temporarily disable this capability. As one of a number of options which may be included in an embodiment 30 (FIG. 3) of the dual bus terminal, a user-operable switch 36 provides a means for selectively limiting periods of extension line operability. Such a capability is one which is not presently available in conventional analog phone systems.

When the premises extension phone network comprises analog phones 29 the necessary 48 VDC power may readily be supplied from a source 34 in each DBT 30. In anticipation of such multiple power sources, element 34 preferably includes resistors sufficient to provide protection against inadvertent wiring errors during installation. Alternatively, the power may be provided from a single DBT 30 or from an external source, not shown.

Since the one ISDN terminal, such as DBT 20, initially involved in a call setup is designated by ISDN protocol to be the controlling terminal, any discontinuation of the communication at DBT 20 would normally likewise discontinue the communication between all extension terminals and the remote terminal. It may well be, however, that it is desired that any terminal on the premises be allowed to continue a communication after the controlling terminal user has completed all intended business. An optional detector component 38 in a controlling DBT 30 senses continued extension phone activity and provides such flexibility either independently or at the discretion of the user of DBT 30.

Such a detector might comprise a current flow sensor, e.g. a common Ferrod device or a simple relay 31, which is activated by the level of current flow during the off-hook condition of any of the extension terminals. Where the extension terminal is another DBT, appropriate resistors in its switchhook element 32 provide a signature similar to the off-hook impedance of an analog phone. In the simpler mode noted above, this sensor initiates a signal, such as LED 33, by which the user of DBT 30 is made aware of any off-hook extension terminal. The user of DBT 30 may then allow continued extension use by remaining off-hook or otherwise maintaining the connection between CPL 24 and bus 27 at switchhook element 32. Visible signal 33 also provides an additional benefit of alerting one to an inadvertent reversal of wiring between analog bus 27 and a second powered DBT during installation.

For independent continuation of extension phone communication after an on-hook condition at a controlling DBT, a similar sensing circuit may be employed, for example utilizing an LED 35 and photodetector 37, to provide a logic signal to call control (CC) component 23 via line 39 to inhibit the initiation of the clearing of the active ISDN call as long as any extension phone is in use. Also the logic signal is used to control means, not shown, for maintaining the closure of switch element 32 even after a physical on-hook condition at a DBT, except when that terminal is in the "null" state.

Higher levels of call control may also be permitted for extension terminals in the present invention. For example, a degree of control over CC 23 of DBT 30 may be provided to an analog terminal 29 on bus 27 such that upon the occurrence of an off-hook condition in terminal 29 while the DBT is in the "call received" state the logic signal generated at photodetector 37 of the DBT detector 38 initiates the sending of a CONNECT message from DBT 30. In the earlier-noted manner the closure of switch element 32 is effected by use of this logic signal. An analog terminal 29 could thus be used to directly answer an incoming call. In such an operation, however, it is preferable to allow a sufficient time delay after the analog terminal off-hook condition to enable a user at an ISDN terminal to take direct control of the call. For further variations of the present system, additional analog buses may be included in the premises network and may be maintained independently for different groups of extension terminals or may be selectively AC-coupled with other buses or connected with various terminals, all at the discretion of the user.

Additional options made possible by the dual bus arrangement of the present invention should readily become apparent to the skilled artisan. These and other embodiments of the invention are nonetheless to be included within the scope of the invention as set out in the appended claims.

What is claimed is:

1. An ISDN communication terminal comprising:
   (a) digital/analog signal conversion means;
   (b) first analog signal port means communicating with the analog side of said conversion means;
   (c) second analog signal port means; and
   (d) means coupling to said second port means signals communicated between said conversion means and said first port means.

2. An ISDN communication terminal according to claim 1 wherein said coupling means comprises means providing electrical signal coupling among said conversion means, said first port means, and said second port means.

3. An ISDN communication terminal according to claim 2 comprising DC power source means intermediate said coupling and second port means.

4. An ISDN communication terminal according to claim 2 comprising circuit-interrupting switch means intermediate said coupling and second port means.

5. An ISDN communication terminal according to claim 2 comprising current flow detection means intermediate said coupling and second port means.

6. An ISDN communication terminal according to claim 5 wherein said current flow detection means comprises user-alerting signaling means.

7. An ISDN communication terminal according to claim 5 which further comprises digital call control and processing means communicating with said digital/analog signal conversion means and wherein said current flow detection means comprises means for signaling said digital call control and processing means.

8. An ISDN extension phone system comprising:
   (a) an ISDN passive bus;
   (b) ISDN terminal means communicating with said ISDN bus and comprising digital/analog signal conversion means communicating with electro/audio analog signal transducer means;
   (c) an analog bus;
   (d) coupling means communicating with said analog bus signals communicated between said conversion means and said transducer means; and
   (e) analog signal terminal means communicating with said analog bus.

9. An ISDN extension phone system according to claim 8 wherein:
   (a) said ISDN terminal means further comprises analog signal port means communicating with said analog bus; and
   (b) said coupling means comprises means providing electrical coupling of signals among said conversion means, said transducer means, and said port means.

10. An ISDN extension phone system according to claim 9 wherein said ISDN terminal means further comprises DC power source means intermediate said coupling and port means.

11. An ISDN extension phone system according to claim 10 wherein said ISDN terminal means further comprises circuit-interrupting switch means intermediate said coupling and port means.

12. An ISDN extension phone system according to claim 8 wherein said ISDN terminal means further comprises means for detecting active extension phone communication between said analog signal terminal means and said analog bus.

13. An ISDN extension phone system according to claim 12 wherein said ISDN terminal means further comprises digital call control and processing means communicating with said ISDN bus and wherein said detecting means comprises means for signaling said call control and processing means.

14. An ISDN extension phone system according to claim 13 wherein said detecting means comprises current flow detection means intermediate said coupling and port means.

15. An ISDN extension phone terminal comprising digital signal port means for communicating with an ISDN passive bus, digital/analog signal conversion means, digital call control and processing means communicating between said port and conversion means, analog signal port means for communicating with electro/audio transducer means, and means providing signal communication between said analog signal port means and the analog side of said conversion means
   characterized in that said terminal further comprises second analog signal port means for communicating with at least one on-premises extension phone and coupling means for providing electrical coupling of signals among said analog signal port means, said conversion means, and said second port means.

16. An ISDN terminal according to claim 15
   characterized in that said terminal further comprises DC power source means intermediate said coupling and second port means.

17. An ISDN communication terminal according to claim 15
   characterized in that said terminal further comprises circuit-interrupting switch means intermediate said coupling and second port means.

18. An ISDN terminal according to claim 15
   characterized in that said terminal further comprises current flow detection means intermediate said coupling and second port means.

19. An ISDN terminal according to claim 18
   characterized in that said current flow detection means comprises user-alerting signaling means.

20. An ISDN terminal according to claim 18
   characterized in that said current flow detection means comprises means for signaling said call control and processing means.

* * * * *